United States Patent [19]

Jansson

[11] Patent Number: 4,688,881
[45] Date of Patent: Aug. 25, 1987

[54] OPTICAL, INTEGRATED WAVEGUIDE COMPONENT

[75] Inventor: Mats A. H. Jansson, Täby, Sweden

[73] Assignee: Telefonaktiebolaget LM Ericsson, Stockholm, Sweden

[21] Appl. No.: 795,344

[22] PCT Filed: Jan. 29, 1985

[86] PCT No.: PCT/SE85/00041
§ 371 Date: Oct. 10, 1985
§ 102(e) Date: Oct. 10, 1985

[87] PCT Pub. No.: WO85/03780
PCT Pub. Date: Aug. 29, 1985

[30] Foreign Application Priority Data

Feb. 17, 1984 [SE] Sweden ............................ 8400858

[51] Int. Cl.$^4$ ........................ G02B 6/10; G02B 6/12
[52] U.S. Cl. .............................. 350/96.11; 350/96.12
[58] Field of Search ............. 350/96.11, 96.12, 96.13, 350/96.14

[56] References Cited

U.S. PATENT DOCUMENTS 4,198,115  4/1980  Kaminow .................. 350/96.12 X
4,433,895  2/1984  Puech et al. .............. 350/96.14 X Primary Examiner—Eugene R. LaRoche
Assistant Examiner—Steven J. Mottola
Attorney, Agent, or Firm—Roberts, Spiecens & Cohen

[57] ABSTRACT

An optical, integrated waveguide component has a single crystal body (20) e.g. of lithium niobate which has a flat upper surface (22) provided with waveguides (23) and flat parallel end surfaces (21). The crystal has cleavage planes, and an optical axis in the crystal can be defined with a given inclination to these planes. The end surfaces (21) of the body (20) consist of cleavage planes for obtaining small losses when coupling light into the waveguides (23). The upper surface (22) is oriented such that in relation to the crystalline structure, the optical axis of the crystal is in a plane (24) defined by the normals ($\overline{n2}$, $\overline{n1}$) to the upper surface and the end surfaces. The angle between the upper surface (22) and end surfaces (21) deviates from a right angle by an angle ($\beta$) of a most 10 degrees.

5 Claims, 6 Drawing Figures

OPTICAL, INTEGRATED WAVEGUIDE COMPONENT

FIELD OF THE INVENTION

The invention relates to an optical, integrated waveguide component including a single crystal body, which has a flat upper surface provided with waveguides and flat, parallel end surfaces, the crystal having cleavage planes along which the crystalline bonds are weaker than the other bonds in the crystal so that cleavage of the crystal is facilitated along these cleavage planes, and the crystal has a greatest and a least refractive index in two mutually right-angular directions so that an optical axis can be determined, in the direction of which the refractive index of the crystal has a given value independent of the polarization direction of an incident light ray, and the cleavage planes have given inclination in relation to the optical axis.

BACKGROUND

In optical information transmission, it is essential that the transmission losses are small, both in the different parts of the transmission system and in the coupling between these parts. Waveguide components of the kind mentioned for such systems are known, and in them the orientation of the single crystal body in relation to the crystalline structure is such that the attenuation and dispersion of the light in the waveguides are small. In order that the components will also have small coupling losses, the end surfaces of the body are carefully polished, and this makes the production of the components complicated. Waveguide components are also known where the end surfaces of the body are cleavage surfaces, which gives small coupling losses. The latter components are produced in a simple way, but the orientation of the single crystal body in relation to the crystalline structure is such that large losses are obtained in the waveguides. These components are therefore not usable in many applications.

SUMMARY OF THE INVENTION

The problems mentioned are solved by the orientation of the single crystal body in relation to the crystalline structure being selected so that coupling of light into the waveguides takes place via a cleavage surface and the flat upper surface of the component is oriented in a special way in relation to the optical axis, so that optimum optical properties are obtained. The invention is characterized in the claims.

BRIEF DESCRIPTION OF THE DRAWINGS

An embodiment of the invention will now be described in conjunction with the accompanying drawings, where.

BEST MODE FOR CARRYING OUT THE INVENTION

Figure 1:
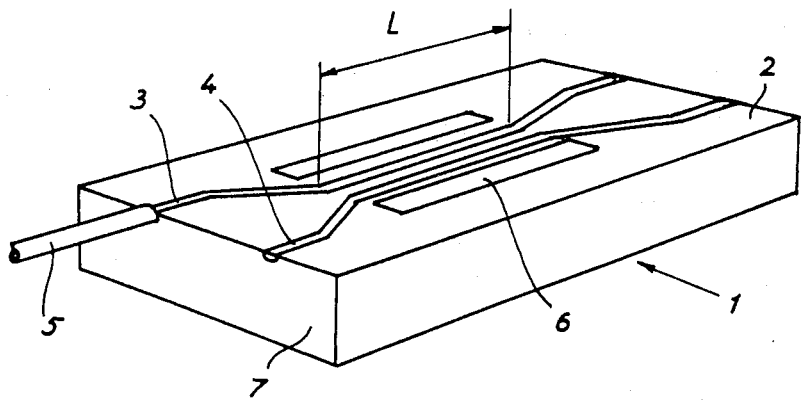
FIG. 1 is a perspective view of an optical, integrated waveguide component, FIG. 2 schematically illustrates the crystalline structure for lithium niobate.

As an example there is illustrated in FIG. 1 an optical, integrated waveguide component, which is a so-called directional coupler. A more detailed description of it will be found in IEEE Journal of Qantum Electronics, Vol. QE 17, No. 6, June 1981, Rod C. Alferness, "Guided-Wave Devices for Optical Communication". A single crystal body 1 made of material such as lithium niobate $LiNbO_3$ or lithium tantalate $LiTaO_3$ conventionally carries light waveguides 3 and 4 on its upper flat surface 2. These waveguides have a higher refractive index than the crystalline material and can be provided, for example, by diffusing titanium into the crystal to a suitable depth in a desired pattern. Light is introduced into one waveguide 3 e.g. by a lens system or, as is illustrated in the Figure, an optical fiber 5. The fiber is directed towards the mouth of the waveguide at the end surface 7 of the body, at a small distance from the end surface. The light is spread to a small part in the crystal and may be led over to the other waveguide 4, along an interaction distance L of the waveguides, by coupled oscillations occurring between the waveguides. This coupling can completely or partially be counteracted by applying an electric voltage to metal electrodes 6, which are placed on the surface of the crystal along the interaction distance of the waveguides. Distribution of the light between the outputs of the component may thus be controlled electrically.

Transmission losses occur with a light wave which is transmitted via a waveguide component of the kind described, partly during coupling in and out of the light wave at the ends of the waveguides and partly during passage of the light wave through the waveguides. The coupling losses are dependent on the optical quality of the end surfaces of the crystal in the areas where the waveguides open out, and the losses in the waveguides are greatly dependent on the orientation of the waveguides in relation to the crystalline structure. How the single crystal body is oriented in relation to the crystalline structure is therefore essential.

Figure 2:
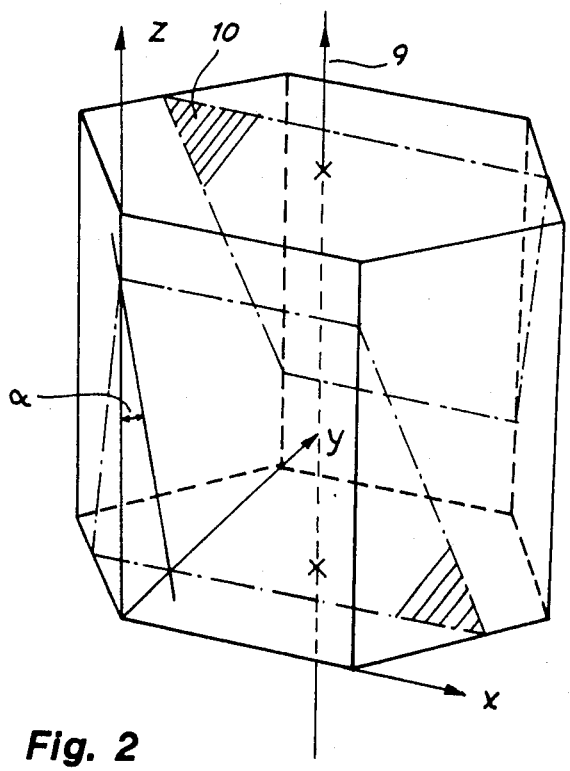

FIG. 2 schematically illustrates the structure for lithium niobate using the orientation of a right-angular coordinate system with the axes x,y,z in relation to the hexagonal unit cell normally used for lithium niobate. A more detailed description of the structure is to be found, e.g. in J. Phys. Chem. Solids, Pergamon Press 1966, Vol. 27, ppl 997–1012, "Ferroelectric Lithium Niobate. 3. Single Crystal X-ray Diffraction Study at 24° C." Lithium niobate has double refractive indices and has its least refractive index in the direction of the z-axis and its largest in the xy-plane, independent of the direction in this plane. A light ray 9 in the direction of the z-axis is affected in the crystal by the refractive index, which is constant for all polarization directions in the xy-plane. The refraction of a light ray in this direction is thus independent of the polarization direction of the light ray, and since this only applies to the z-axis, this axis is unambigously determined and defines the optical axis of the crystal. Lithium niobate has cleavage planes along which the crystal bonds are weaker than the remaining bonds of the crystal. Cleavage planes 10 are indicated by chain-dotted lines in the Figure, these planes being associated with a collection of mutually parallel cleavage planes. There are also other collections of cleavage planes in the crystal, the orientation of which in the illustrated coordinate system is determined by the symmetrical properties of the crystal. The planes form an angle $\alpha = 32.75°$ with the optical axis. The crystal may be cleaved in a simple way along these planes and the cleavage surfaces thus obtained have very good optical quality. This property is utilized, as previously mentioned, to produce integrated waveguide components with small coupling losses.

Figure 3:
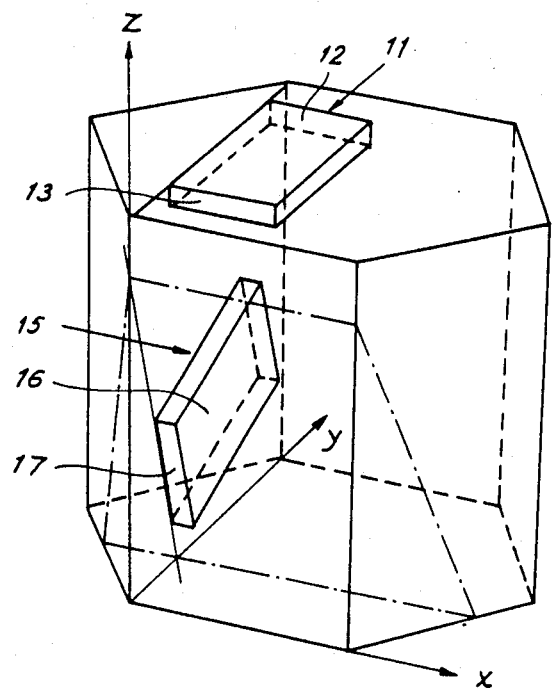
FIG. 3 illustrates how single crystal bodies in known components are oriented in relation to the crystalline structure.

FIG. 3 illustrates how the single crystal bodies in known waveguide components are oriented in relation to the crystalline structure. A component can have a single crystal body 11 with a flat upper surface 12, the normal to the surface of which is in the direction of the z-axis, and end surfaces 13 which are parallel to the xz-plane. The end surfaces in this orientation are polished so that the coupling losses will be small. A component may also have a single crystal body 15 with a flat upper surface 16, the normal to the surface of which is in the direction of the x axis, and end surfaces 17 consisting of cleavage surfaces. With this orientation, waveguides on the surface 16 obtain undesired optical properties, such as rotation of the light polarization plane and spreading of the light in the crystal.

Figure 4:
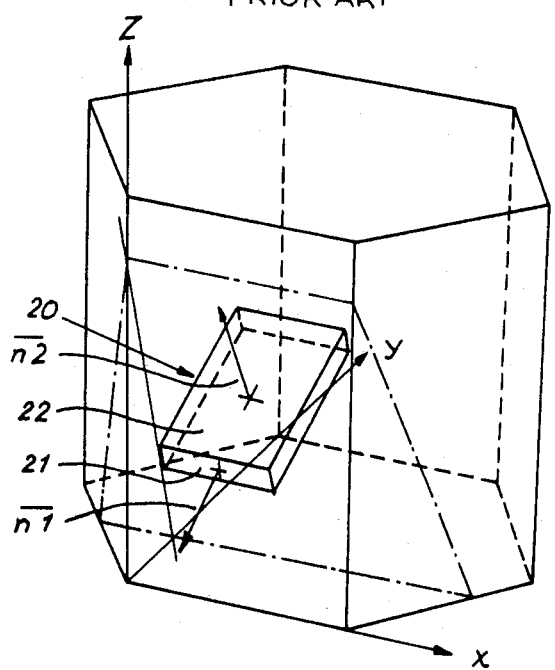
FIG. 4 illustrates how a single crystal body in accordance with the invention is oriented in relation to the crystalline structure.
Figure 5:
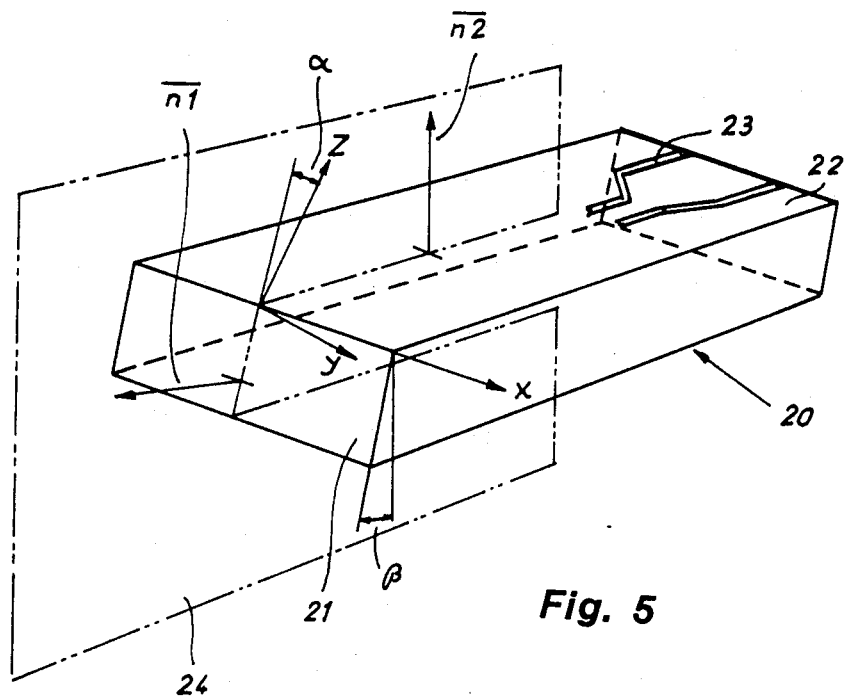
FIG. 5 is a perspective view of a crystal body for a waveguide component in accordance with the invention and FIG. 6 is a cross section of an end portion of a component in accordance with the invention.

FIG. 4 illustrates how a single crystal body 20 for an integrated waveguide component in accordance with the invention, is oriented in relation to the crystalline structure. The body has end surfaces 21 constituting cleavage surfaces, and a flat upper surface 22 oriented such that the optical axis of the crystal, the z-axis, is in a plane, defined by the normals $\overline{n1}$ and $\overline{n2}$ of the end surfaces 21 and the upper surface 22, respectively. FIG. 5 illustrates the single crystal body 20 with waveguides 23 indicated on its upper surface. The plane defined by the normals $\overline{n1}$ and $\overline{n2}$ is denoted in the Figure by 24 and is indicated with chain-dotted lines. This plane contains, according to the above, the optical axis or z-axis of the crystal, and for lithium niobate this axis forms the angle $\alpha = 32.75°$ with the cleavage plane of the crystal.

Figure 6:
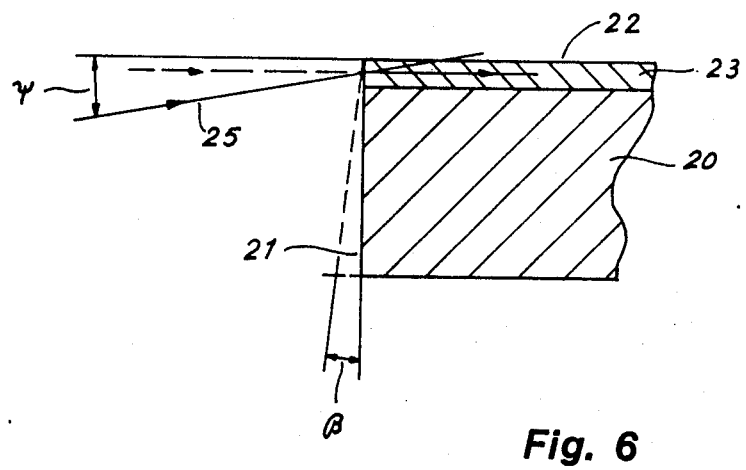

In a calculation of the light propagation in the waveguides there is obtained the result, for a component in accordance with the invention, that a light ray shall be incident at a given angle to the end surface of the component for the losses in the waveguides to be minimum. FIG. 6 illustrates how a light ray 25 is incident at an angle of $\psi$ to the waveguide 23. The latter opens out on the end surface 21 of the component, which is at right angles to the upper surface 22. For practical reasons it is often desired, however, that the light ray shall be incident parallel to the upper surface of the component, as is illustrated in the Figure by the dashed ray. As mentioned, this results in losses if the upper surface and end surface are at right angles. These losses may be compensated by including the end surface at an angle $\beta$, as is indicated by dashed lines in the Figure. For a component of lithium niobate an angle $\psi = 4.0°$ gives the minimum losses in the waveguides if the end surface is at right angles to the upper surface. If the incident light ray is parallel to the upper surface, the angle $\beta = 3.3°$ gives the minimum losses.

What is claimed is:

1. An optical, integrated waveguide component including a single crystal body, which has a flat upper surface provided with waveguides and flat, parallel end surfaces, the crystal having cleavage planes along which the crystal bonds are weaker than the other bonds in the crystal, so that the cleavage of the crystal is facilitated along said cleavage planes, and the crystal has a maximum and a minimum refractive index in two mutually right-angular directions so that an optical axis can be determined, in the direction of which the refractive index of the crystal has a given value independent of the polarization direction of an incident light ray, and said cleavage planes have given inclination of relation to the optical axis, said end surfaces being formed along cleavage planes for obtaining small losses in coupling light into the waveguides, said flat upper surface being oriented such that in relation to the crystalline structure the optical axis of the crystal is in a plane defined by the normals $(\overline{n2}, \overline{n1})$ to the flat upper surface and the end surfaces, respectively so that favorable wave propagation in the waveguides is obtained.

2. A waveguide component as claimed in claim 1, wherein the angle between said flat upper surface and said end surface deviates from a right angle by an angle ($\beta$) of at most 10 degrees, which is the optimum angle of incidence for the respective crystal material, so that the incident light direction will be parallel to said flat upper surface.

3. A waveguide component as claimed in claim 2 wherein said angle ($\beta$) is 3.3°.

4. A waveguide component as claimed in claim 2 wherein said optical axis forms a positive angle of elevation with respect to said upper surface.

5. A waveguide component as claimed in claim 4 wherein said angle of elevation is $90 - (\alpha + \beta)$ wherein $\alpha$ is the angle between the cleavage planes and the optical axis.

* * * * *